(12) United States Patent
Sansone

(10) Patent No.: US 7,386,458 B2
(45) Date of Patent: Jun. 10, 2008

(54) RECIPIENT ELECTED MESSAGING SERVICES FOR MAIL THAT IS TRANSPORTED IN TRAYS OR TUBS

(75) Inventor: Ronald P. Sansone, Weston, CT (US)

(73) Assignee: Pitney Bowes Inc., Stamford, CT (US)

( * ) Notice: Subject to any disclaimer, the term of this patent is extended or adjusted under 35 U.S.C. 154(b) by 995 days.

(21) Appl. No.: 09/818,480

(22) Filed: Mar. 27, 2001

(65) Prior Publication Data

US 2002/0143428 A1 Oct. 3, 2002

(51) Int. Cl.
*G06Q 10/00* (2006.01)
(52) U.S. Cl. .......................................... 705/1
(58) Field of Classification Search ........ 705/400–411, 705/60, 1; 209/584, 900; 709/206, 1
See application file for complete search history.

(56) References Cited

U.S. PATENT DOCUMENTS

| 4,037,956 A | 7/1977 | McKeen, Jr. |
| 4,962,532 A | 10/1990 | Kasiraj et al. |
| 5,031,223 A | 7/1991 | Rosenbaum et al. |
| 5,079,714 A | 1/1992 | Manduley et al. |
| 5,086,300 A | 2/1992 | Ashmore |
| 5,293,250 A | 3/1994 | Okumura et al. |
| 5,400,335 A | 3/1995 | Yamada |
| 5,612,889 A | 3/1997 | Pintsov et al. ......... 364/478.14 |
| 5,636,038 A | 6/1997 | Lynt et al. |
| 5,648,916 A | 7/1997 | Manduley ............... 364/514 A |
| 5,737,729 A | 4/1998 | Denman |
| 5,754,671 A * | 5/1998 | Higgins et al. ............. 382/101 |
| 5,790,790 A | 8/1998 | Smith et al. |

(Continued)

FOREIGN PATENT DOCUMENTS

CA 1178711 A 11/1984

(Continued)

OTHER PUBLICATIONS

Unknown author, "Sharp extends fax line with scan-to-e-mail feature", Nov. 16, 2000, Purchasing, vol. 129 Issue 9, p. 174, 1/3 p. 1c.*

(Continued)

*Primary Examiner*—Igor N Borissov
(74) *Attorney, Agent, or Firm*—Ronald Reichman; Angelo N. Chaclas

(57) ABSTRACT

A method that enables a recipient to inform a carrier of the manner in which the recipient would like mail that is transported in trays or tubs delivered. The recipient is then able to inform a post or courier e.g., Federal Express®, Airborne®, United Parcel Service®, DHL®, etc., of the manner in which the recipient would like the mail delivered. The post and courier hereinafter will be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the carrier email or fax the contents of the mailpiece to the recipient and/or parties designated by the recipient.

32 Claims, 8 Drawing Sheets

U.S. PATENT DOCUMENTS

| | | | |
|---|---|---|---|
| 5,825,865 | A | 10/1998 | Oberlander et al. |
| 5,838,768 | A | 11/1998 | Sumar et al. ............... 379/89 |
| 5,872,926 | A | 2/1999 | Levac et al. |
| 5,943,408 | A | 8/1999 | Chen et al. |
| 5,944,786 | A | 8/1999 | Quinn |
| 5,974,449 | A | 10/1999 | Chang et al. |
| 5,987,508 | A | 11/1999 | Agraharam et al. |
| 6,020,980 | A | 2/2000 | Freeman |
| 6,044,362 | A | 3/2000 | Neely |
| 6,047,272 | A | 4/2000 | Biliris et al. |
| 6,052,442 | A | 4/2000 | Cooper et al. |
| 6,058,420 | A | 5/2000 | Davies |
| 6,061,448 | A | 5/2000 | Smith et al. |
| 6,061,790 | A | 5/2000 | Bodnar |
| 6,064,995 | A | 5/2000 | Sansone et al. |
| 6,072,862 | A | 6/2000 | Srinivasan ............ 379/100.08 |
| 6,073,165 | A | 6/2000 | Narasimhan et al. |
| 6,081,899 | A | 6/2000 | Byrd |
| 6,085,231 | A | 7/2000 | Agraharam et al. |
| 6,108,688 | A | 8/2000 | Nielsen |
| 6,259,533 | B1 | 7/2001 | Toyoda et al. |
| 6,273,267 | B1* | 8/2001 | Tamamoto et al. ......... 209/546 |
| 6,285,777 | B2* | 9/2001 | Kanevsky et al. .......... 358/402 |
| 6,289,323 | B1 | 9/2001 | Gordon et al. |
| 6,293,037 | B1 | 9/2001 | Spada et al. |
| 6,321,211 | B1 | 11/2001 | Dodd |
| 6,333,973 | B1 | 12/2001 | Smith et al. |
| 6,343,327 | B2 | 1/2002 | Daniels, Jr. et al. |
| 6,390,921 | B1 | 5/2002 | Busch et al. |
| 6,411,393 | B1 | 6/2002 | Wakasugi |
| 6,427,164 | B1 | 7/2002 | Reilly |
| 6,434,603 | B1 | 8/2002 | Tsuji et al. |
| 6,459,364 | B2 | 10/2002 | Gupta |
| 6,532,489 | B1 | 3/2003 | Merchant |
| 6,542,584 | B1 | 4/2003 | Sherwood et al. |
| 6,549,612 | B2 | 4/2003 | Gifford et al. |
| 6,604,132 | B1 | 8/2003 | Hitt |
| 6,621,892 | B1 | 9/2003 | Banister et al. |
| 6,647,385 | B2 | 11/2003 | Seestrom et al. |
| 6,697,858 | B1 | 2/2004 | Ezerzer et al. |
| 6,710,894 | B1 | 3/2004 | Ogawa |
| 6,711,154 | B1 | 3/2004 | O'Neal |
| 6,721,784 | B1 | 4/2004 | Leonard et al. |
| 6,741,724 | B1 | 5/2004 | Bruce et al. |
| 2001/0021261 | A1 | 9/2001 | Koga et al. |
| 2002/0002590 | A1* | 1/2002 | King et al. ............... 709/206 |
| 2002/0042808 | A1* | 4/2002 | Smith et al. ............... 709/1 |
| 2002/0095306 | A1* | 7/2002 | Smith et al. ............... 705/1 |
| 2002/0165729 | A1 | 11/2002 | Kuebert et al. |

FOREIGN PATENT DOCUMENTS

| | | |
|---|---|---|
| DE | 197 45 641 A1 | 11/1999 |
| EP | 0 375 139 A2 | 11/1989 |
| EP | 0465011 A2 * | 1/1992 |
| EP | 1063602 A1 * | 12/2000 |
| WO | WO 99/21330 | 10/1998 |
| WO | WO 02/01434 A1 * | 1/2002 |
| WO | WO 02/42979 A1 * | 5/2002 |

OTHER PUBLICATIONS

Hoffman et al, "Couriers deliver new net services", Jan. 6, 1997, 2 pages, Computerworld, v31, n1.*

Bill Murray, "U.S. Postal Service eyes the web for growth the postal agency wants to offer all U.S. residents an e-mail address track and reroute their mail online", Jul. 6, 2000, Bloomberg News, p. b07.*

Pitney Bowes Inc. Software Solutions regarding ReUnion™ Data Quality to a New Level dated 1998.

Pitney Bowes Inc. Software Solutions regarding Final Focus™ Your Single Source for Geographic, Demographic and Lifestyle Information dated 1998.

The Session Initiation Protocol: Internet-Centric Signaling—Schulzrinne, et al. (2000); www.cs.columbia.edu/-idrosen/papers/commag_final.pdf.

Turms: A Non-invasive Certified Email System—Nita-Rotaru; www.cnds.jhu.edu/-crisn/papers/turms.ps.gz.

EmailValet: Learning User Preferences for Wireless Email—Mackassy, Dayanik, Hirsh (1999); www.ai.cs.uni-dortmund.de/EVENTS/IJCAI99-MLIF/papers/macscassy.ps.gz.

Formal Development of Secure Email—Shou, Kuo, Older, Chin (1999); web.syr.edu/-dzhou/papers/hicss99.ps.gz.

Practical Protocols For Certified Electronic Mail—Deng, Gong, Lazar, Wang (1996); java.sun.com/people/gong/papers/certified-email.ps.gz.

Post: A secure, resilient, cooperative messaging system—Alan Mislove Ansley; www.usenix.org/events/hotos03/tech/full_papers/mislove/mislove.pdf.

Formal Analysis of a Secure Communication Channel: Secure..- Dan Zhou; ocelot.cat.syr.edu/-danzhou/papers/fm99.ps.

www.PeopleFinderNow.com, Skip Tracing and People Locates, pp. 1-6.

Pace, Andrew "It's A Matter of Privacy", Jun. 2001, The Gale Group.

Wattendorf, George, "Stalking Investigation Strategies", Mar. 2000, FBI Law Enforcement Bulletin, Dialog No. 04717583.

Graham, Robert, Carnivore FAQ (Frequently Asked Questions), www.robertgraham.com/pubs/carnivore-faq.html.

An Efficient Implementation Scheme of Concurrent Object-Oriented Languages on Stock Multicomputers, Taura et al. (1993); fto.vl.is.s.u-tokyo.ac.ip/pub/papers/pooop93-multicomputer-letter.os.oz.

Pin-down Cache: A Virtual Memory Management Technique for Zero-copy Communication—Tezuka, et al. (1998); www.rwcp.or.jp/pm/../papers/tr97006.ps.gz.

Linux Magazine I Jul. 1999 I Features I Secrets Inside the Linux Kernel Revealed; www.linux.mag.com/1999-07/kernel_03.html.

* cited by examiner

RECIPIENT ELECTED MESSAGING SERVICES FOR MAIL THAT IS TRANSPORTED IN TRAYS OR TUBS

CROSS REFERENCE TO RELATED APPLICATIONS

Reference is made to commonly assigned copending patent application Ser. No. 09/818,792 filed herewith entitled "Recipient Elected Messaging Services" in the names of Ronald P. Sansone, Robert A. Cordery, and Donald G. Mackay; Ser. No. 09/818,721 filed herewith entitled "Sender Elected Messaging Services" in the names of Ronald P. Sansone, Robert A. Cordery and Donald G. Mackay; Ser. No. 09/81 7,998 filed herewith entitled "Messaging Services for the Visually Impaired" in the name of Ronald P. Sansone; Ser. No. 09/818,800 filed herewith entitled "Messaging Services For Uniquely Identified Mail" in the name of Ronald P. Sansone; Ser. No. 09/818,195 filed herewith entitled "Method For Determining If Mail Contains Life Harming Materials" in the name of Ronald P. Sansone; and Ser. No. 09/818,277 filed herewith entitled "Method For A Carrier To Determine The Location Of A Missing Person".

FIELD OF THE INVENTION

The invention relates generally to the field of mail delivery systems and, more particularly, to systems that may deliver mail by physical and/or electronic means.

BACKGROUND OF THE INVENTION

People have directly transmitted information from one person to another. Information was first transmitted by spoken word and later by the written word. Writings enabled people to transmit information by messengers from a location in which the sender of the writing was present to another location where the receiver was present. In time, postal services were developed in which a person would deliver letters to the post office in one city and an agent of the post office would deliver that letter to a post office in another city where the letter mail would be picked up by the person to whom the letter was sent.

Ever since the numeric codification of streets and buildings received general acceptance, an individual's name and household postal address have been linked. The sender of a letter or package would deliver a letter or package to the post, that had the correct recipient postal address, and the post would deliver the letter or package to the numeric street address of the recipient of the letter or package. A correct recipient postal address for the delivery of the letter or package to the recipient included the name of the recipient; the street address of the recipient; the city and state of the recipient; and the zip code of the recipient. Thus, the correct recipient postal address is usually the actual location of the recipient.

Typically, it takes the post three to five days to deliver letters and/or packages to a recipient. Sometimes, recipients of letters and packages like to know what letters and packages they are going to receive before they receive them. For instance, if someone is going on a trip, they may want to receive their bills, e.g., credit card, electric, gas, oil, hospital, doctor, etc., before they leave on the trip so that they may pay the bills before a finance charge for late payment is applied to their account. Someone may also want to receive a package before going on a trip so that they may take the contents of the package on the trip. The recipient may also want to delay delivery of a particular letter or package until they return from their trip. The reason for the foregoing may be that the recipient does not want to retrieve the letter or package at the post office or have the letter or package waiting at a vacant house.

SUMMARY OF THE INVENTION

This invention overcomes the disadvantages of the prior art by providing a method that enables the recipient to receive notification of the letters, flats and/or packages (mail) that is transported in trays or tubs, which the recipient is going to receive prior to the delivery of the mail. The recipient is then able to inform a post or courier, e.g., Federal Express®, Airborne®, United Parcel Service®, DHL®, etc., of the manner in which the recipient would like mail that is transported in trays or tubs delivered. The post and courier hereinafter will be referred to as "carrier". For instance, the recipient may want the mail physically delivered to their house faster or slower, or the mail physically redirected to the recipient's temporary address, or physically delivered to the recipient's agent, or physically delivered to the recipient's attorney, or physically returned to the mailer, or have the carrier open the physical mail and have the carrier e-mail or fax the contents of the mailpiece to the recipient and/or parties designated by the recipient.

An additional advantage of this invention is that the recipient will be informed of the estimated time that the mail will be delivered earlier in the delivery process. In fact, the estimated time of delivery will be calculated while the mail is being sealed and sent to the recipient upon completion of the tray or tub.

This invention accomplishes the foregoing by scanning the name and physical address of the recipient and the sender of the mail after the mail has been sealed; capturing the name and physical address of the recipient and the sender; translating the name and physical address of the recipient into an e-mail address; notifying the recipient of the availability of the sealed mail; depositing with the carrier the sealed mail containing the recipient's name and physical address and the sender's name and address; notifying the carrier of the manner in which the recipient would like the mail delivered; and delivering mail to the recipient in the manner specified by the recipient to the carrier.

DETAILED DESCRIPTION OF THE PREFERRED EMBODIMENT

Figure 1A:
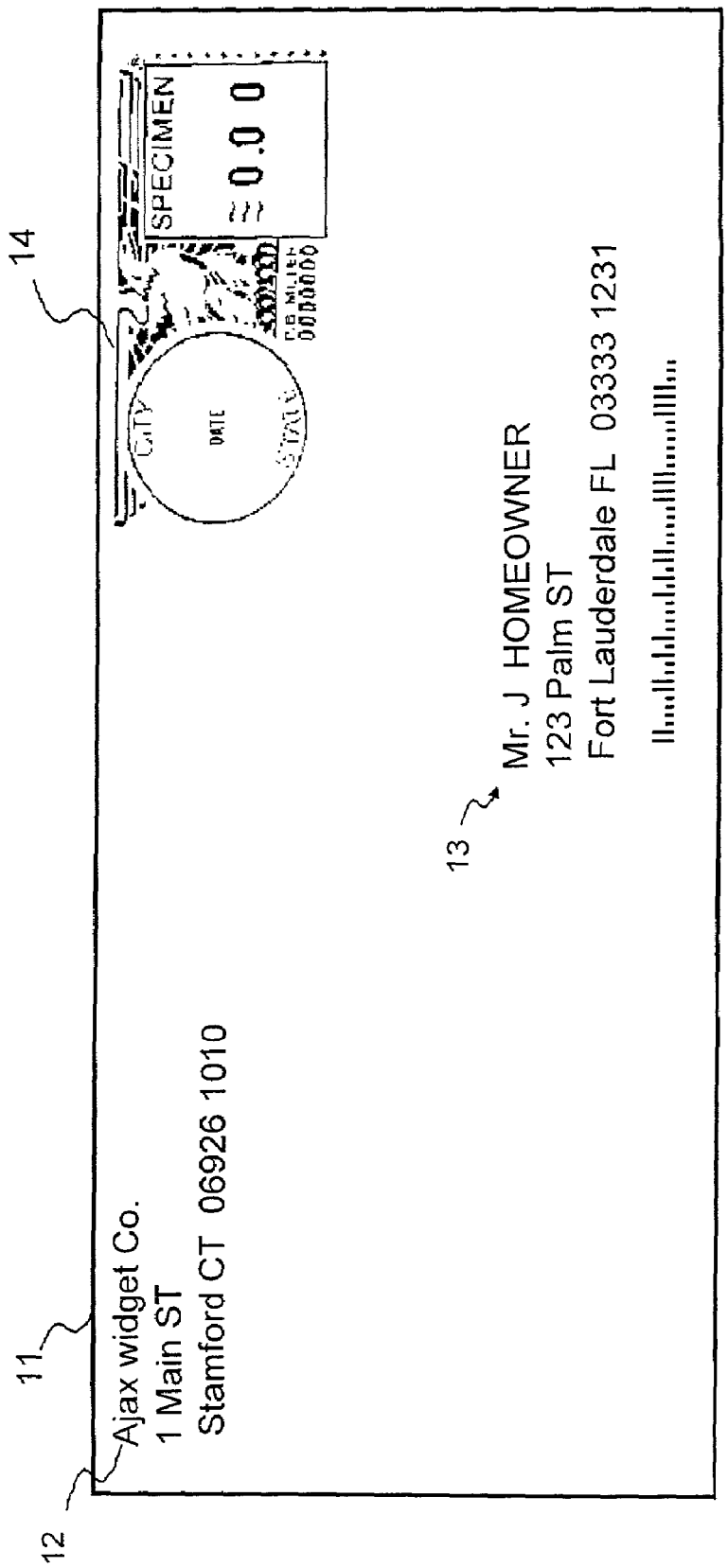
FIG. 1A is a drawing of a metered mailpiece.

Referring now to the drawings in detail and more particularly to FIG. 1A, the reference character 11 represents a mailpiece that has a sender address field 12, a recipient address field 13 and a postal indicia 14.

Figure 1B:
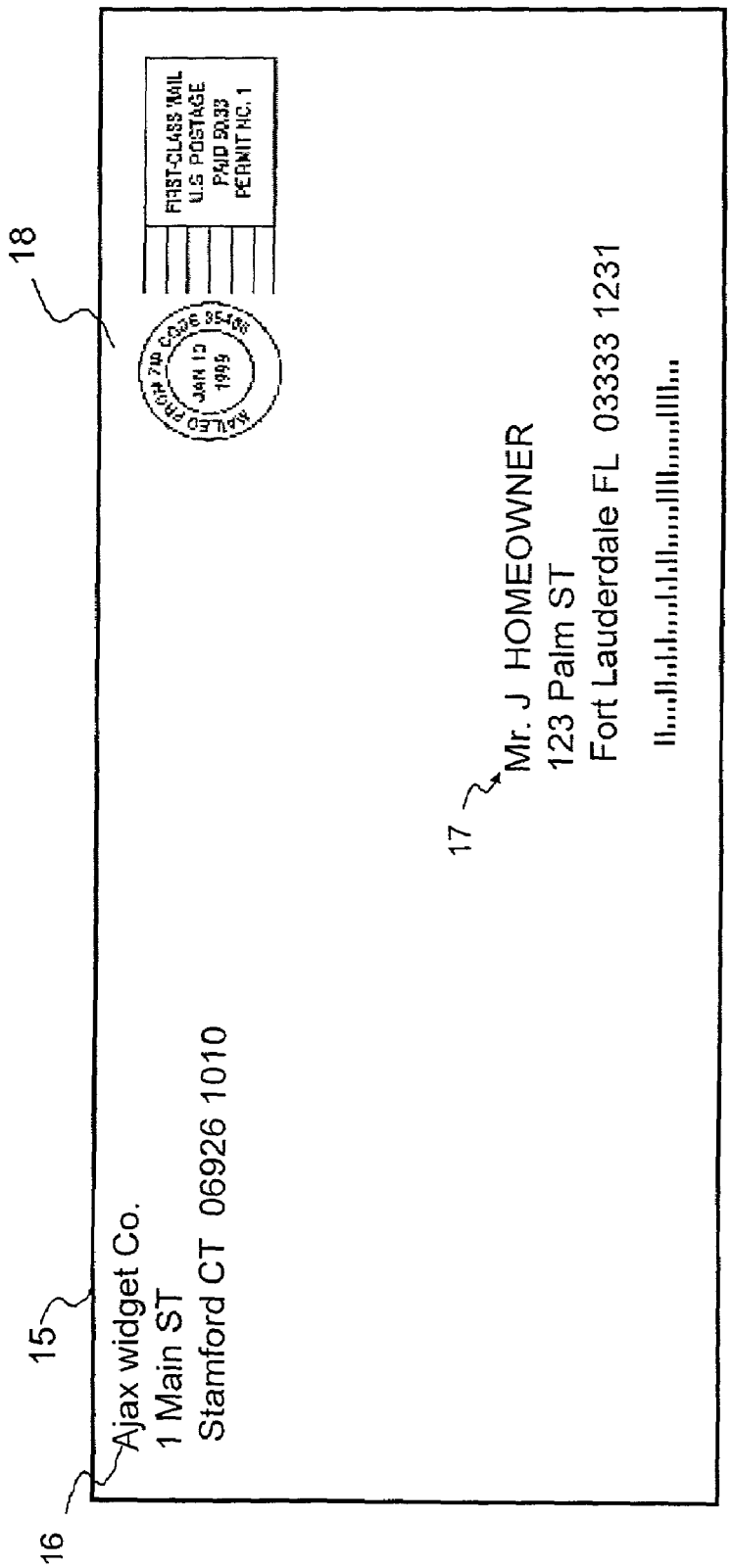
FIG. 1B is a drawing of a permit mailpiece.

FIG. 1B is a drawing of a permit mailpiece. Mailpiece 15 has a sender address field 16, a recipient address field 17 and a permit 18.

Figure 1C:
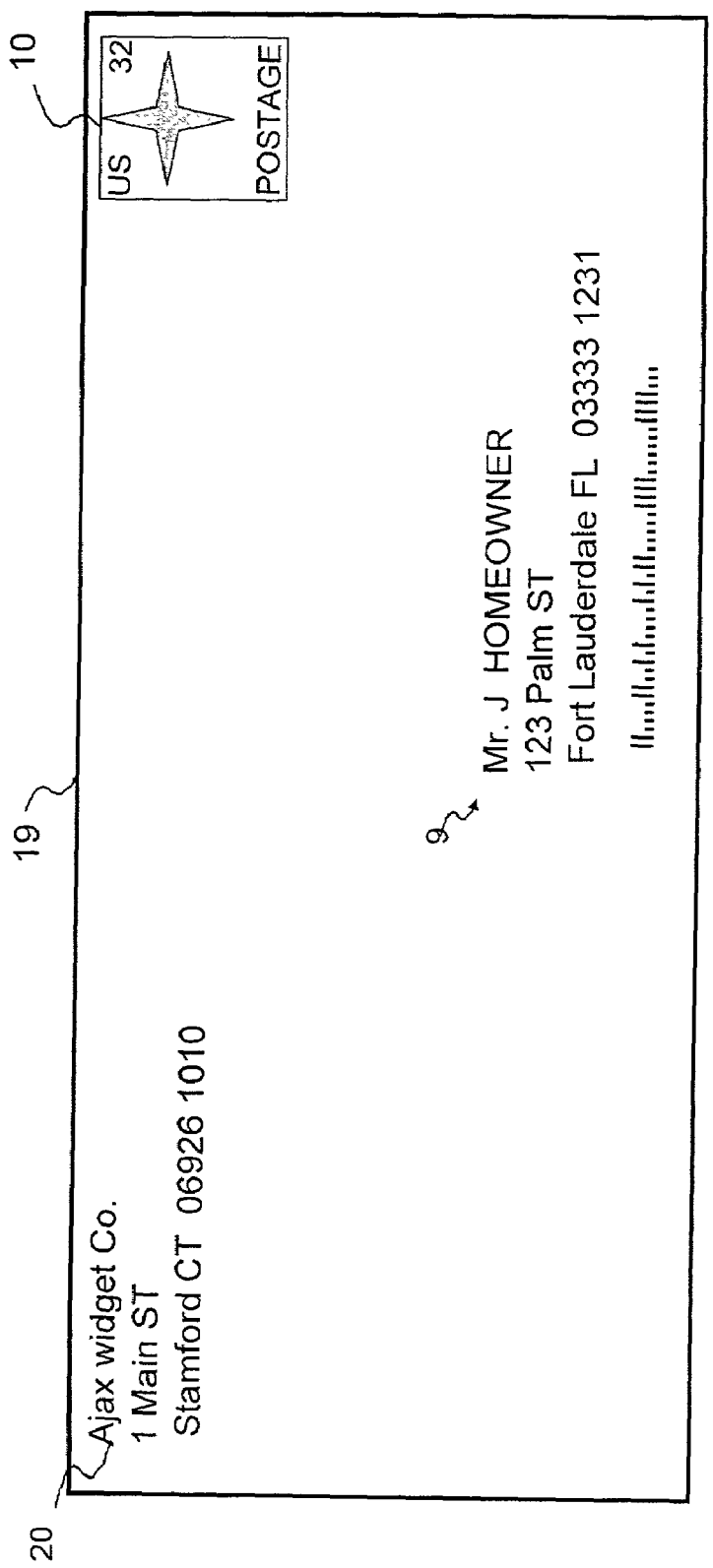
FIG. 1C is a drawing of a stamped mailpiece.

FIG. 1C is a drawing of a stamped mailpiece. Mailpiece 19 has a sender address field 20, a recipient address field 9 and a stamp 10.

Figure 1D:
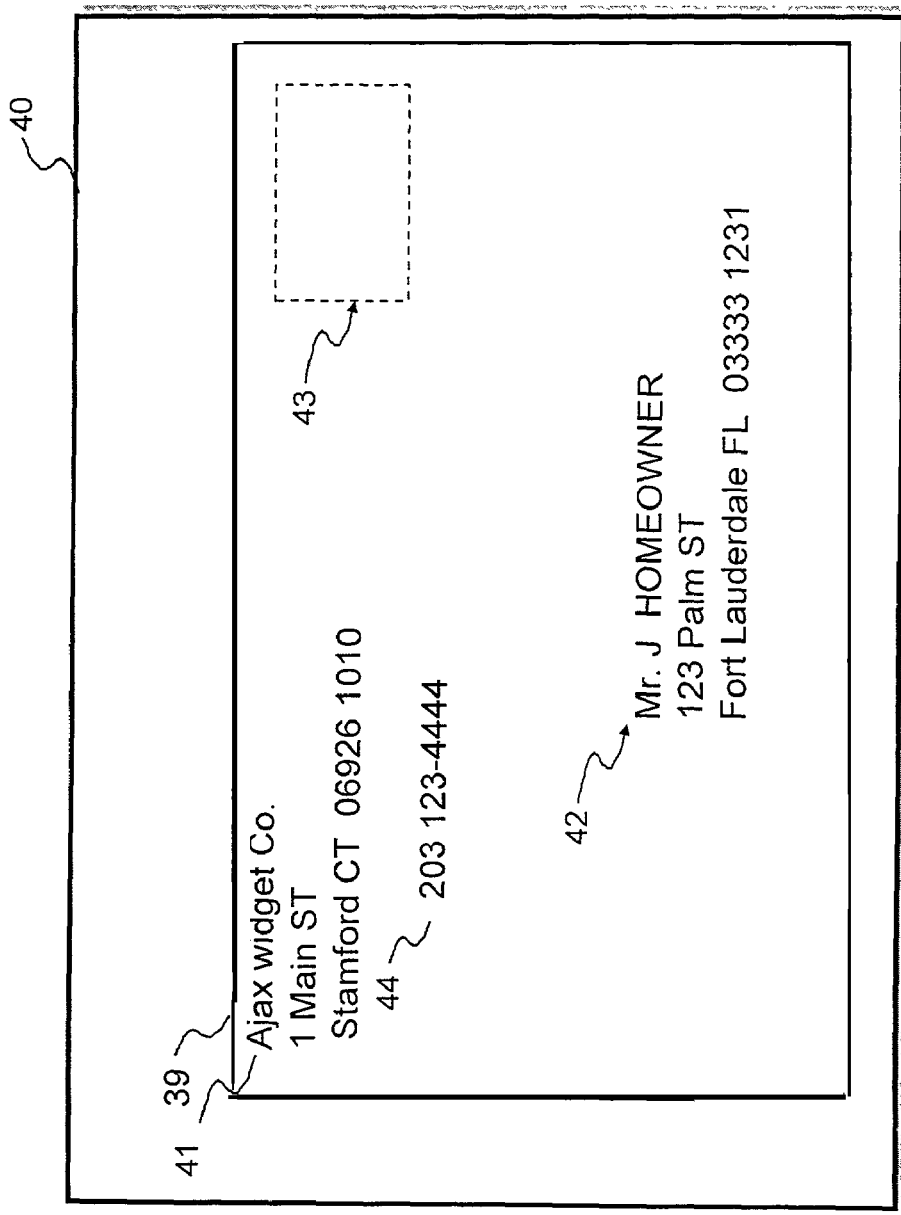
FIG. 1D is a drawing of a flat or package that is going to be delivered by a carrier.

FIG. 1D is a drawing of a flat or package that is going to be delivered by a carrier. Package 40 has a label 39 affixed thereto. Label 39 has a sender address field 41, a recipient address field 42 and may have other sender information, e.g., the senders phone number 44. Indicia 43 is affixed to label 39. Indicia 43 may be a postal indicia or courier symbology.

FIGS. 1A-1D show various methods of evidence for the payment of postage. It will be obvious to one skilled in the art that additional methods of evidence for the payment of postage exist.

Figure 2:
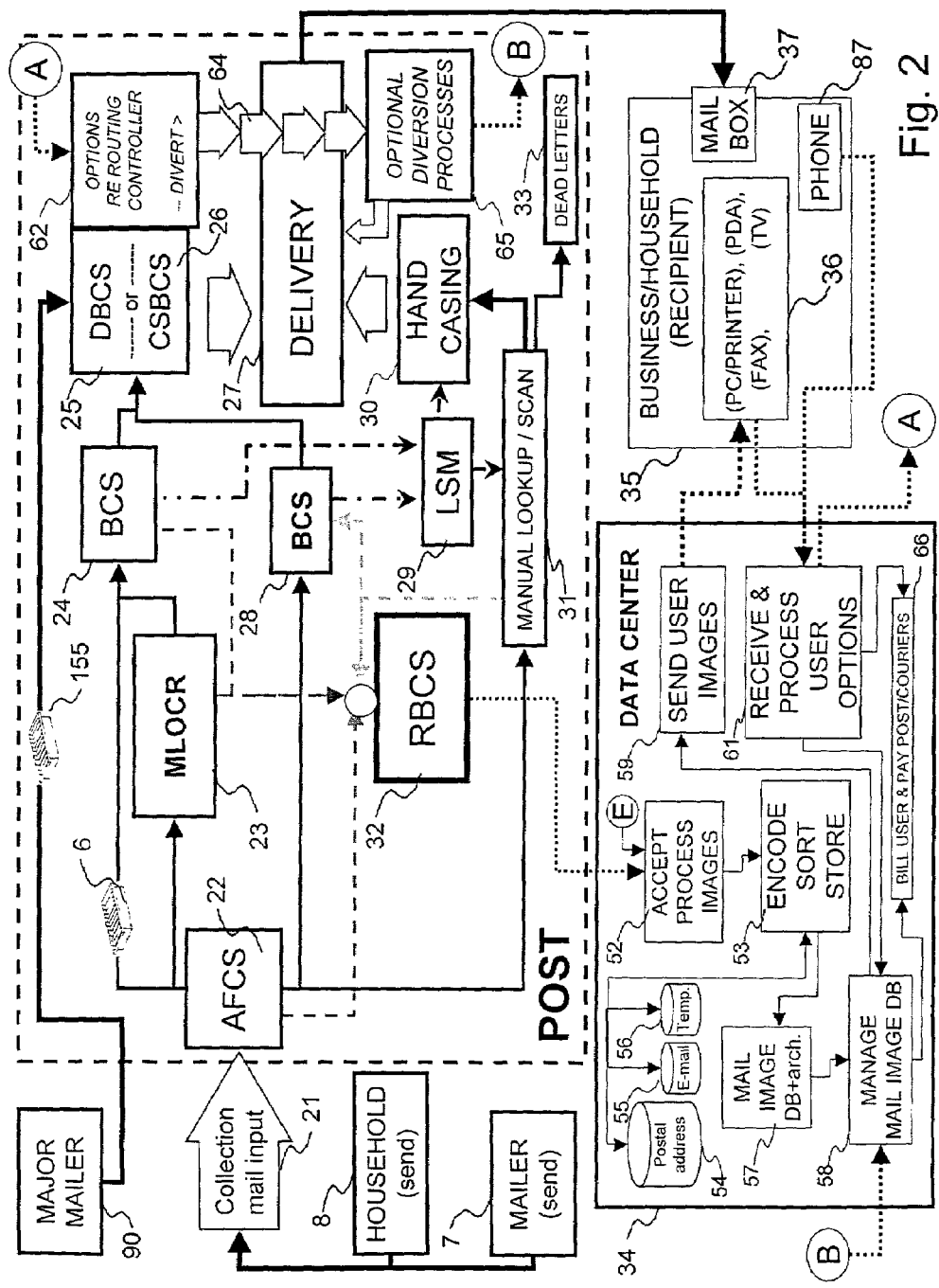
FIG. 2 is a drawing showing how this invention may be used by a post in the processing of letter mail.

FIG. 2 is a drawing showing how this invention may be used by a post in the processing of letter mail. Letter mail that is deposited in trays 6 and delivered to the post is read by multiple line optical character reader (hereinafter "MLOCR") 23. Collection letter mail may be metered letter mail that is produced at a mailer site 7 or a sender household 8 by a postage meter or a personal computer meter, stamped mail, or permit mail. Collection letter mail is placed in collection mail input 21, e.g., mail boxes or delivered to the United States Postal Service unsorted. Collection letter mail is sent to advanced facer canceller (hereinafter "AFCS") 22. AFCS 22 first faces the letter mail. Then AFCS 22 electronically identifies and separates prebarcoded mail, handwritten addresses and machine-imprinted address pieces for faster processing through automation. Letter mail that AFCS 22 determines is optical character readable is sent to MLOCR 23. Reader 23 reads the entire address on the letter mail: sprays a bar code on the mail; and then sorts the mail. Letter mail that is able to be scanned and sorted by reader 23 is sent to bar code sorter/code printer 24. Letter mail that the mailer has prebarcoded and contains a facing identification mark is sent to bar code sorter/code printer (hereinafter "BCS") 24.

Trayed mail 155 that is produced at a major mailer site 90 (FIG. 5) is sent to a delivery bar code sorter/code printer (hereinafter "DBCS") 25 or a carrier sequence bar code sorter/code printer (hereinafter "CSBCS") 26. An image of the face of the mailpieces in trayed mail 155 and the estimated time of arrival of each letter mailpiece in tray 155 are sent to accept process image 52. Sorters 25 and 26 sort the letter mail in the order that the mail is going to be delivered by postal carrier 27. Letter mail that AFCS 22 determines is not optical character readable is sent to bar code sorter/code printer (hereinafter "BCS") 28. Letter mail that AFCS 22 obtains electronic images from and letter mail that reader 23 obtains electronic images from transfer the electronic images to remote bar code system (hereinafter "RBCS") 32. RBCS 32 matches the look up zip code for the letter mailpieces from AFCS 22 and merges them. System 32 electronically transmits the bar code information to BCS 28 where the bar code information is sprayed on the mailpieces. Letter mail that is able to be scanned and sorted by sorters 24 and 28 is sent to a DBCS 25. Sorters 25 and 26 sort the letter mail in the order that the mail is going to be delivered by postal carrier 27, or hold the mail for recipient diversion for a specified period of time in divert mail options rerouting controller 62.

Letter mail that can not be scanned and sorted by sorters 24 and 28 is sent to letter sort machine (hereinafter "LSM") 29. Letter mail that can be sorted by LSM 29 is sent to postal hand casing 30. Postal hand casing 30 is the process in which the postal carrier sorts the letter mail in the order that the letter mail is going to be delivered by postal carrier 27. Letter mail that can not be sorted by letter sort machine 29 is sent to manual process 31. Manual process 31 attempts to classify the previously rejected letter mailpiece to redirect the mailpiece, declare the mailpiece dead, or manually recode the mailpiece for redelivery. Then the letter mailpieces that have not been processed in manual lookup, scan and sortation process 31 are sent to dead letters 33. In process 31, an operator may determine the address of the recipient and produce a label to be placed on the letter mail. Then the letter mail would go to postal hold casing 30 where the mail is sorted in the order that the mail is going to be delivered by postal carrier 27.

Letter mail that can not be faced and cancelled by AFCS 22 is sent to manual process 31. Manual process 31 attempts to classify the previously rejected letter mailpiece to redirect the mailpiece, declare the mailpiece dead, or manually re-code the mailpiece for redelivery. Then the letter mail that manual process 31 is able to classify is sent to postal carrier casing 30 before it is delivered by postal carrier 27.

Coded video system 32 electronically transmits the bar code information that represents the destination of the letter mailpiece and the party to whom the mailpiece is to be delivered and the image of the face of the mailpiece to data center 34. The aforementioned scanners scan all of the information appearing on the face of the letter mail, e.g., (from FIG. 1A) the sender's name and address 12, the recipient's name and address 13, and postal indicia 14. The scanned information is transferred to accept process images 52. Then the information is sent to encode, sort, store 53. At this point, the recipient's physical address is verified by checking postal address data base 54, and the recipient's e-mail address is determined from e-mail data base 55. Temporary data base 56 is then searched to determine whether or not the recipient has left any forwarding addresses. Encode 53 then encodes and sorts the information obtained from data bases 54, 55 and 56.

The aforementioned encoded and sorted information is stored in mail image data base 57. Then the mail image information is sent to manage mail image 58 where the various options and the costs associated therewith that the recipient may have for delivering the information contained in the letter mail are determined. Then the mail images and options that the recipient has for receiving the letter mail are sent to images 59, where the information appearing on the face of the letter mail in alphanumeric and graphic form and the options in alphanumeric and graphic form the recipient has for receiving the letter mail are transmitted to receiving device 36 (personal computer, television, facsimile machine, personal data assistant, etc.), which is located at the recipient's business or household 35. The options that the recipient has for diverting the letter mail is described in the description of FIG. 4.

The recipient may use device 36 (personal computer, facsimile machine, personal data assistant, etc.) located at the recipient's business or household 35 to inform receive and process recipient options 61, located at data center 34, of the manner in which the letter mail should be delivered. The recipient may also use a touch tone and/or voice telephone 87 to inform options 61 of the manner in which the recipient would like the letter mail displayed on the receiving device 36, e.g., television delivered. For instance, the recipient may want the letter mail physically delivered to the recipient's house faster or slower, or the letter mail physically redirected to the recipient's temporary address, or physically delivered to the recipient's agent, or physically delivered to the recipient's attorney, or physically returned to the mailer, or have the post open the letter mail and have the post e-mail or fax the contents of the letter mail to the recipient and/or parties designated by the recipient.

At this juncture, the recipient may inform options 61 via a device 36 of the manner in which the recipient would like the letter mail processed. Options 61 will then inform the recipient via device 36 of the cost to the recipient to process the letter mail in the manner selected by the recipient. The recipient may then inform the post to deliver the letter mail in the manner selected by the recipient. The recipient's selected manner of letter mail processing is forwarded to options rerouting controller 62. If the post's specified time to deliver the letter mail has not been reached, the letter mail is sent to recipient options 64 and delivered in the manner selected by the recipient in route mail options 65. Then options 65 informs manage mail data base 58 to archive the image and also to notify bill sender and pay carriers 66 to bill the recipient and pay the post. At this point, the next letter mail image is ready to be processed.

The letter mail may then be delivered to the recipient at mail box 37 at a faster or slower rate than that selected by the sender; held by the post for a specified amount of time and then delivered to an address specified by the recipient; opened, and the contents of the letter mail faxed to recipient selected fax numbers; opened, and the contents of the letter mail faxed to recipient selected fax numbers, and then the letter mail may be delivered to the physical address specified by the recipient; opened, and the contents of the letter mail e-mailed to recipient's selected e-mail addresses; or, opened, and the contents of the letter mail e-mailed to recipient's selected e-mail addresses, and then the letter mail may be delivered to the physical address specified by the recipient. The recipient may also have instructed the post to return the mail to the sender, to destroy the mail, or to recycle the paper in the letter mail. Options 61 will also send the cost of the recipient's selected manner of delivery to bill recipient 66 so that data center 34 may inform the post to debit the recipient's account or send a bill to the recipient.

Figure 3:
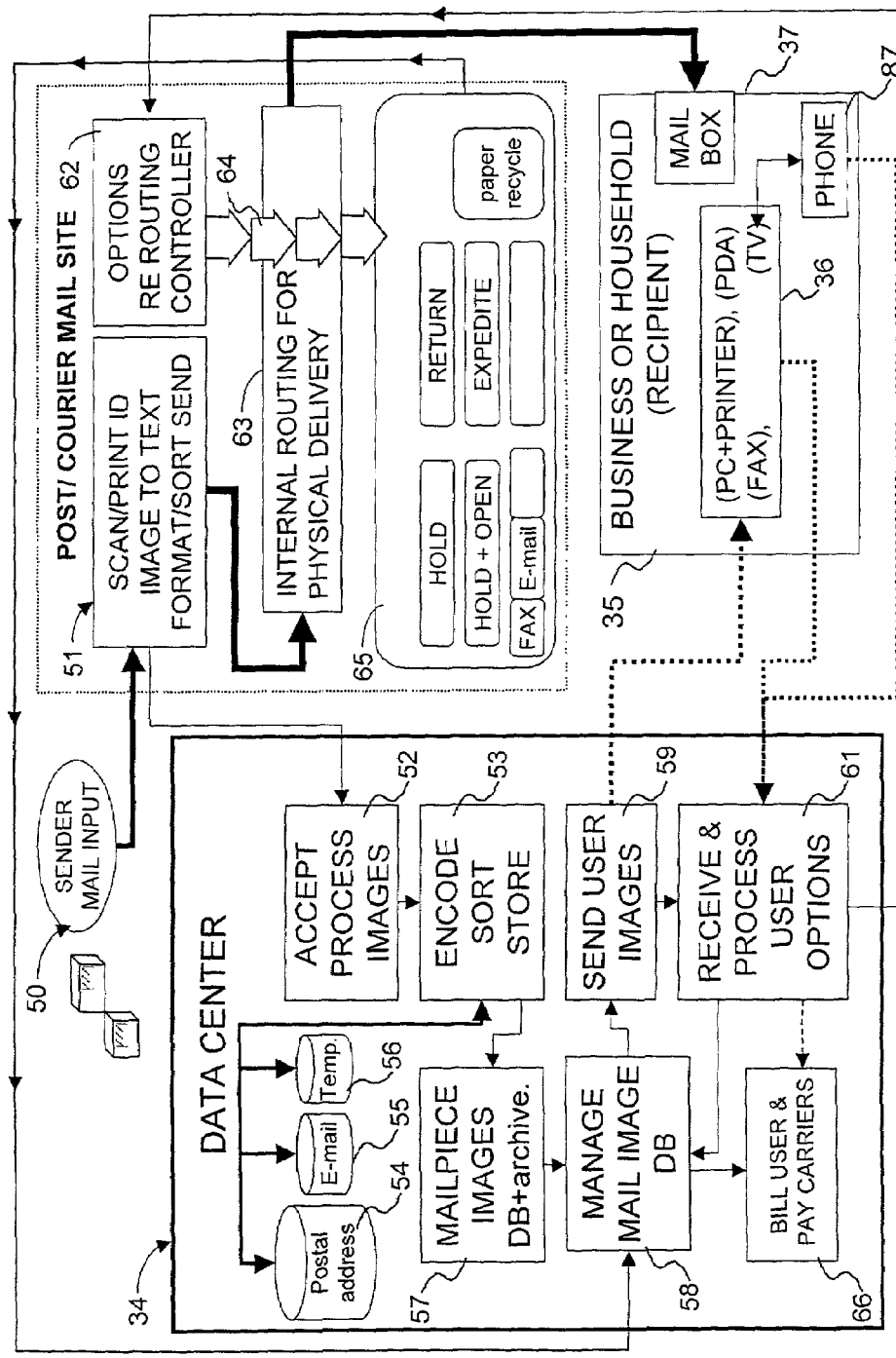
FIG. 3 is a drawing showing how this invention may be used by the post and/or a courier in the processing of flats and packages.

FIG. 3 is a drawing showing how this invention may be used by a post or courier in the processing of packages and flats. Packages and flats that are deposited with the carrier at 50 are scanned by scanner/coder 51. Scanner/coder 51 scans all of the information appearing on the face of the package or flat, e.g., (from FIG. 1D) sender's address 41, the sender's phone number 44, the recipient's address 42 and courier symbology 43. The scanned information is coded, formatted and sorted, and the physical flat or package is sent to internal routing for physical delivery of the package or flat 63. The aforementioned information is transferred to accept process images 52, which is located at data center 34. Then the information is sent to encode, sort, store 53. At this point, the recipient's physical address is verified by checking postal address data base 54, and the recipient's e-mail address is determined from e-mail data base 55. Temporary data base 56 is then searched to determine whether or not the recipient has left any forwarding addresses. Encode 53 then encodes and sorts the information obtained from data bases 54, 55 and 56.

The aforementioned encoded and sorted information is stored in mail image archive data base 57. Then the package or flat image information is sent to manage mail image 58 where the various options and the costs associated therewith that the recipient may have for delivering the information contained in the package or flat are determined. Then the mail images and options that the recipient has for receiving the package or flat are sent to images 59, where the information appearing on the face of the package or flat in alphanumeric and graphic form and the options in alphanumeric and graphic form the recipient has for receiving the package or flat are transmitted to receiving device 36 (personal computer, television, facsimile machine, personal data assistant, etc.) which is located at the recipient's business or household 35. The recipient may use device 36 (personal computer, facsimile machine, personal data assistant, etc.) located at the recipient's business or household 35 to inform receive and process recipient options 61, located at data center 34, of the manner in which the package or flat should be delivered. The recipient may also use a touch tone and/or voice telephone 87 to inform options 61 of the manner in which the recipient would like the package or flat displayed on the receiving device 36, e.g., television delivered. For instance, the recipient may want the package or flat physically delivered to the recipient's house faster or slower, or the package or flat physically redirected to the recipient's temporary address, or physically delivered to the recipient's agent, or physically delivered to the recipient's attorney, or physically returned to the mailer, or have the post open the package or flat and have the post e-mail or fax the contents of the package or flat to the recipient and/or parties designated by the recipient.

At this juncture, the recipient may inform options 61 via a device 36 of the manner in which the recipient would like the package or flat processed. Options 61 will then inform the recipient via device 36 of the cost to the recipient to deliver the package or flat in the manner selected by the recipient. The recipient may then inform the carrier to deliver the package or flat in the manner selected by the recipient. The recipient's selected manner of package or flat delivery is forwarded to options rerouting controller 62. If the carrier's specified time to deliver the package or flat has not been reached, or the package or flat is at internal routing for physical processing 63, the package or flat will be sent to recipient options 62 and delivered in the manner selected by the recipient in route mail options 65. Then options 65 informs manage mail data base 58 to archive the image and also to notify bill sender and pay carriers 66 to bill the recipient and pay the carrier. At this point, the next package or flat image is ready to be processed.

The package or flat may then be delivered to the recipient at mail box 37 at a faster or slower rate than that selected by the sender; held by the courier for a specified amount of time and then delivered to an address specified by the recipient; opened, and the contents of the package or flat faxed to recipient selected fax numbers; opened, and the contents of the package or flat faxed to recipient's selected fax numbers, and then the package or flat may be delivered to the physical address specified by the recipient; opened, and the contents of the package or flat e-mailed to recipient's selected e-mail addresses; or, opened, and the contents of the package or flat e-mailed to recipient's selected e-mail addresses, and then the package or flat may be delivered to the physical address specified by the recipient. The recipient may also have instructed the post or courier to return the mail to the sender or to destroy the contents of the package or flat or recycle the contents of the package or flat. Options 61 will also send the cost of the recipient's selected manner of delivery to bill recipient 66 so that the carrier may debit the recipients account or send a bill to the recipient.

Figure 4:
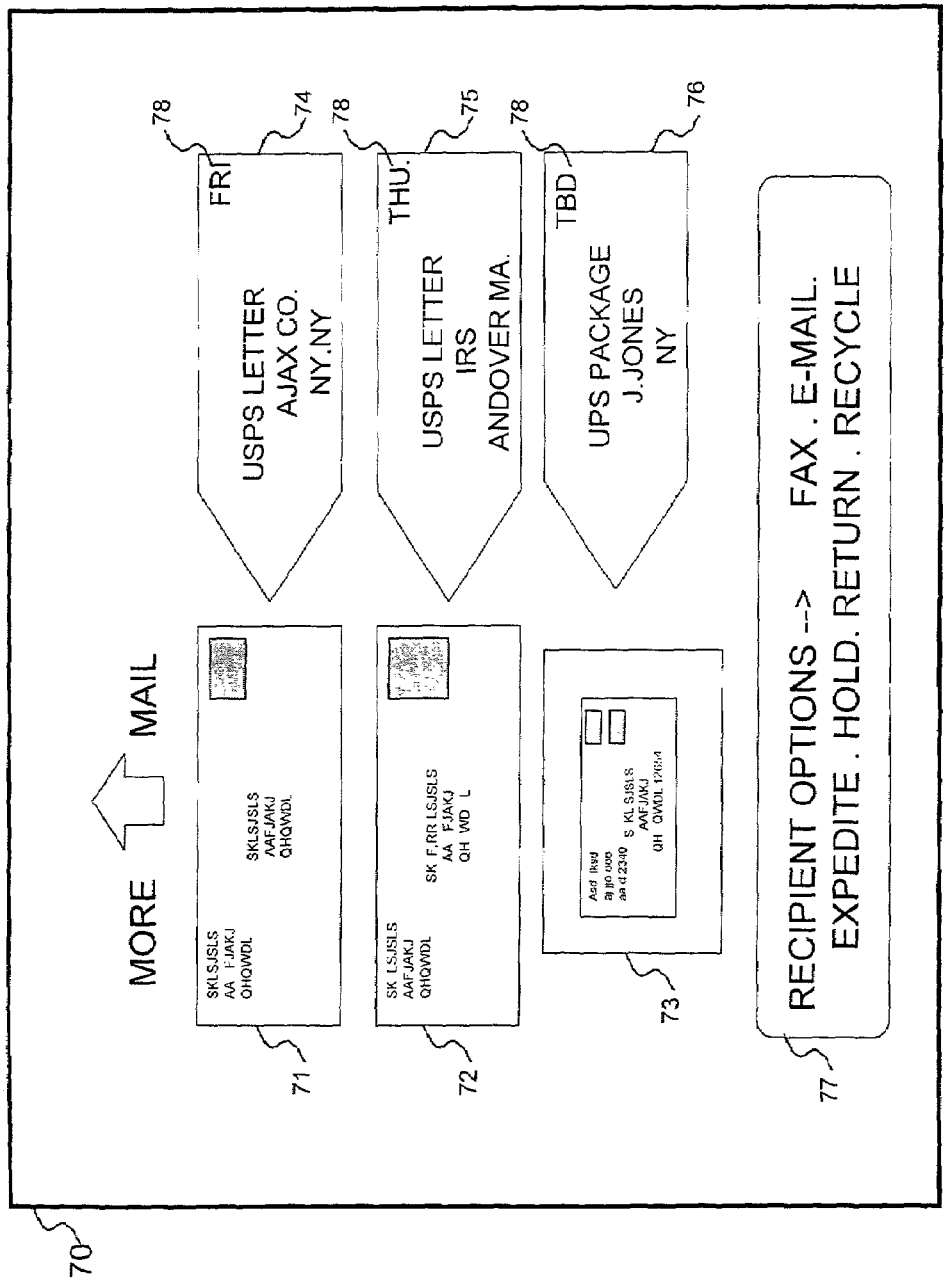
FIG. 4 is a drawing of the information that appears on one or more of receiving devices 36 and FIG. 5 is a drawing of major mailer site 90.

FIG. 4 is a drawing of the information that appears on one or more of receiving devices 36. The information may appear on the display of a personal computer, the screen of a television set, or paper 70 printed by a printer or facsimile machine. An image of the face of a letter mailpiece is shown at 71 and 72, and an image of the face of a flat or package is shown at 73. Data associated with letter mailpiece 71 is shown at 74, and data associated with letter mailpiece 72 is shown at 75. Data associated with package or flat 73 is shown at 76. The options that the recipient has for diverting the mail is shown at 77, and the estimated time of arrival of delivery is shown at 78.

Figure 5:
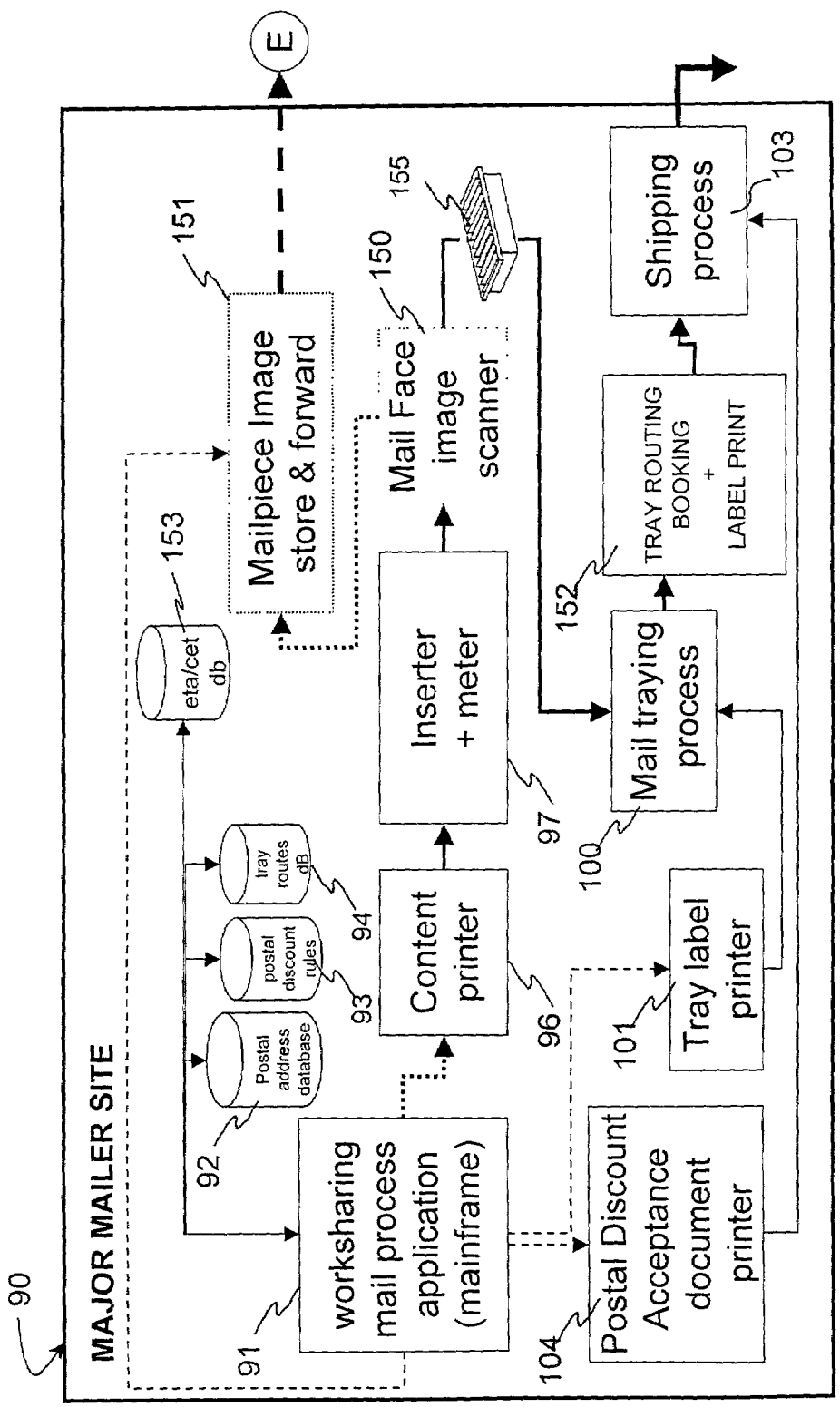

FIG. 5 is a drawing of major mailer site 90 that is used in the production of mailpieces for trays 155 (shown in FIG. 2). A mainframe computer 91 is located at site 90. Computer 91 performs preprocessing of the letter mailpiece by controlling the content and composition of the letter mailpiece as well as the address management, presortation postal requirements, and postal process bar code requirements. Computer 91 is coupled to postal address data base 92, postal discount rules 93, tray routes database 94, and estimated time of arrival and critical entry time data base 153. Data base 153 is maintained current by the carrier. Computer 91 utilizes data base 92, rules 93 and data base 94 to instruct content printer 96 to print the material that is required for the mailing, e.g., information appearing on the face of the letter mailpiece and material that is going to be inserted into the mailpiece and calculation of the discounted postage. Computer 91 utilized data base 153 estimated time of arrivals to calculate the time for the mailpiece to move from site 90 to mail box 37. Inserter and meter 97 inserts the material into the correct mailpiece, seals the mailpiece, applies the correct postage to the mailpiece, places the mailpiece in the proper tray 155 and prepares documentation for the mailpieces in tray 155. Computer 91 will cause tray label printer 101 to print a label according to mail traying process 100 for the tray 155 that inserter and meter 97 is filling. Mail face and image scanner 150 will scan the recipient and sender name and address and other graphical and textual material appearing on the face of the letter mailpiece as the mailpieces are placed in tray 155. Now computer 91 will access data base 153 to calculate the estimated time of arrival of the mailpiece and add the estimated time of arrival to the image scanned by scanner 150. Then mailpiece image store and forward 151 will forward an image of the face of each mailpiece and an estimated time for each mailpiece that has been placed in tray 155 to accept and process images 52 (FIG. 2). Then the trays 155 containing the letter mailpieces go to tray routing and booking process 152 and shipping process 103. When the trays 155 are in shipping process 103, postal discount acceptance printer 104 will be instructed by computer 91 to print the proper postal documentation for the letter mailpieces in tray 155. After process 103 places the proper documentation in trays 155, trays 155 are ready to be shipped to delivery bar code sorter/code printer 25 or sequence bar code sorter/code printer 26 (FIG. 2).

The above specification describes a new and improved method that enables a recipient to inform a carrier of the manner in which the recipient would like mail that is transported in trays or tubs delivered. It is realized that the above description may indicate to those skilled in the art additional ways in which the principles of this invention may be used without departing from the spirit. Therefore, it is intended that this invention be limited only by the scope of the appended claims.

What is claimed is:

1. A method that enables a recipient to inform a carrier of the manner in which the recipient wants some or all of their mail delivered, said method comprises the steps of:

placing by the sender the mail in at least one of trays and tubs for delivery;

scanning the name and physical address of the recipient and the sender of the mail after the mail has been sealed;

capturing by the sender the name and physical address of the recipient and the sender in the form of an image;

transmitting the image to a data center where the image is processed by translating the image consisting of text and graphics to selected alphanumerics;

translating the name and physical address of the recipient into an e-mail address;

notifying the recipient of the expected delivery of the sealed mail and indicating the selected alphanumerics of the translated image;

depositing with the carrier the sealed mail containing the recipient's name and physical address and the sender's name and address;

notifying a data center by the recipient of the manner in which the recipient wants some or all of their mail delivered;

if the recipient desires to destroy the mail, notifying the carrier by the recipient to destroy the mail, if the recipient does not want to destroy the mail, notifying by the data center the carrier of the manner in which the recipient wants the mail delivered; and delivering by the carrier mail to the recipient in the manner specified by the recipient to the carrier.

2. The method claimed in claim 1, wherein the recipient is notified of the estimated time in which the mail is going to be delivered.

3. The method claimed in claim 1, wherein the recipient notifies the carrier to deliver the mail to a specified name and address.

4. The method claimed in claim 1, wherein the recipient notifies the carrier to open the mail.

5. The method claimed in claim 1, further including the steps of:

informing the carrier to e-mail the contents of the mailpiece to the recipient; and mailing by e-mail the contents of the mailpiece to the recipient.

6. The method claimed in claim 5, wherein the recipient notifies the carrier to recycle the material comprising the mail.

7. The method claimed in claim 1, further including the steps of:

informing the carrier to e-mail the contents of the mailpiece to one or more specified e-mail addresses; and mailing by e-mail the contents of the mailpiece to the specified email addresses.

8. The method claimed in claim 1, further including the steps of:

informing the carrier to send by facsimile the contents of the mailpiece to the recipient; and mailing by facsimile the contents of the mailpiece to the recipient.

9. The method claimed in claim 1, further including the steps of:

informing the carrier to facsimile the contents of the mailpiece to one or more specified facsimile numbers; and sending by facsimile the contents of the mailpiece to the specified facsimile numbers.

10. The method claimed in claim 1, wherein the recipient notifies the carrier to deliver the mail to the recipient at a different address.

11. The method claimed in claim 1, wherein the recipient notifies the carrier to deliver the mail to the recipient by a slower delivery method than that paid for by the sender.

12. The method claimed in claim 1, wherein the recipient notifies the carrier to deliver the mail to the recipient by a faster delivery method than that paid for by the sender.

13. The method claimed in claim 1, further including the step of:
charging the recipient for receiving notification of the availability of the deposited mail.

14. The method claimed in claim 1, further including the step of:
charging the recipient for delivering mail to the recipient in the manner specified by the recipient to the carrier.

15. The method claimed in claim 1, further including the step of:
charging the recipient for receiving notification of the availability of the deposited mail; and
charging the recipient for delivering mail to the recipient in the manner specified by the recipient to the carrier.

16. The method claimed in claim 1, further including the step of:
informing the sender of the delivery of the mail.

17. The method claimed in claim 1, wherein the recipient notifies the carrier to hold the mail for a specified period of time.

18. The method claimed in claim 1, wherein the recipient is notified via e-mail of the availability of the deposited mail.

19. The method claimed in claim 1, wherein the recipient is notified via telephone of the availability of the deposited mail.

20. The method claimed in claim 1, wherein the recipient is notified via facsimile of the availability of the deposited mail.

21. The method claimed in claim 1, wherein the recipient is notified via television of the availability of the deposited mail.

22. The method claimed in claim 1, wherein the carrier is notified via e-mail of the manner in which the recipient wants the mail delivered.

23. The method claimed in claim 1, wherein the carrier is notified via facsimile of the manner in which the recipient wants the mail delivered.

24. The method claimed in claim 1, wherein the carrier is notified via telephone of the manner in which the recipient wants the mail delivered.

25. The method claimed in claim 1, wherein the recipient notifies a data center who notifies the carrier of the manner in which the recipient wants the mail delivered.

26. The method claimed in claim 1, wherein the mail deposited with the carrier contains a graphic.

27. The method claimed in claim 26, wherein the graphic is a stamp.

28. The method claimed in claim 26, wherein the graphic is a postal indicia.

29. The method claimed in claim 26, wherein the graphic is a permit.

30. The method claimed in claim 26, wherein the graphic is carrier symbology.

31. The method claimed in claim 26, wherein the graphic is captured and translated.

32. The method claimed in claim 31, wherein the graphic is stored.

* * * * *